(12) United States Patent
Yane et al.

(10) Patent No.: US 7,409,864 B2  
(45) Date of Patent: Aug. 12, 2008

(54) PRESSURE SENSOR AND SUBSTRATE PROCESSING APPARATUS

(75) Inventors: Takeshi Yane, Kyoto (JP); Yasuhiro Mizohata, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 228 days.

(21) Appl. No.: 11/417,765

(22) Filed: May 1, 2006

(65) Prior Publication Data

US 2006/0260409 A1      Nov. 23, 2006

(30) Foreign Application Priority Data

May 18, 2005    (JP)    ............................. 2005-145367

(51) Int. Cl.
*G01L 7/08*    (2006.01)

(52) U.S. Cl. ....................................... 73/715

(58) Field of Classification Search ............ 73/715–728
See application file for complete search history.

(56) References Cited

U.S. PATENT DOCUMENTS 6,561,039 B2    5/2003    Ozawa 7,337,677 B2 *    3/2008    Mizohata .................. 73/861.52  
2006/0112771 A1 *    6/2006    Mizohata .................. 73/861.52  
2007/0042511 A1 *    2/2007    Abiko et al. .................. 438/14

FOREIGN PATENT DOCUMENTS

JP    7-72029    3/1995  
JP    2002-310823    10/2002

* cited by examiner

*Primary Examiner*—Max Noori  
(74) *Attorney, Agent, or Firm*—Ostrolenk, Faber, Gerb & Soffen, LLP

(57) ABSTRACT

A pressure sensor comprises a thin disk-shaped diaphragm, a laser displacement meter for detecting an amount of deformation of the diaphragm, and an operation part connected to the laser displacement meter. In the pressure sensor, an amount of deformation of the diaphragm due to pressure of fluid flowing into the pressure sensor is detected by the laser displacement meter, and pressure of the fluid is obtained on the basis of the amount of deformation and conversion information stored in the operation part in advance. The base part of the diaphragm of the pressure sensor is made of graphite (or silicon substrate), and a thin film of silicon carbide which is in contact with fluid is formed on a surface of the base part. This improves chemical resistance to the pressure sensor and extends the lifetime of the pressure sensor while preventing metal elution.

4 Claims, 3 Drawing Sheets

PRESSURE SENSOR AND SUBSTRATE PROCESSING APPARATUS

BACKGROUND OF THE INVENTION

1. Field of the Invention

The present invention relates to a pressure sensor comprising a diaphragm and a substrate processing apparatus comprising a pressure sensor.

2. Description of the Background Art

Conventionally, a fluid pressure sensor comprising a diaphragm between fluid and a pressure receiving device has been used. In such a pressure sensor, fluid flowing through a pipe presses the diaphragm, the pressure receiving device detects a pressing amount of the diaphragm, and a signal circuit converts the pressing amount into a pressure value.

In semiconductor processing apparatuses and various chemical plants, frequently used are chemicals with high corrosivity such as oxidizing power or the like or high permeability, and a fluid pressure sensor used in such a condition is needed to have extremely high chemical resistance and permeation resistance (penetration resistance). For example, fluorocarbon resin with high chemical resistance is used as material for forming a diaphragm. However, in a pressure sensor having high chemical resistance, if chemicals with high corrosivity and high permeability such as high-concentrated hydrofluoric acid (HF) are used, the lifetime of the pressure sensor is reduced to about one year and frequent calibrations are necessary, and these cause increase in running cost for a semiconductor manufacturing apparatus.

In the foregoing situation, with respect to a liquid contacting member contacting with chemicals having high corrosivity and high permeability (penetrating power), material for the member, arrangement of the pressure receiving device, or the like have been improved. For example, Japanese Patent Application Laid Open Gazette No. 7-72029 discloses a technique for improving chemical resistance, where a housing is made of material mainly composed of fluorocarbon resin and a pressure sensing part of a sensor device is made of anticorrosive material. The housing is divided into a part for a diaphragm and a part for holding the sensor device. Japanese Patent Application Laid Open Gazette No. 2002-310823 discloses a pressure sensor having a structure with excellent corrosion resistance to extend the lifetime, where a protective cap is attached to an end of a working rod and the end is housed in a diaphragm to which pressure of fluid is applied.

In the pressure sensor used in the semiconductor processing apparatus, the liquid contacting member such as the diaphragm or the like needs to have chemical resistance as described above and have an extremely low level of metal elution. Fluorocarbon resin such as PFA (a copolymer of tetra-fluoro-ethylene and per-fluoro-alkyl-vinyl-ether), PTFE (poly-tetra-fluoro-ethylene), PCTFE (poly-chloro-trifluoro-ethylene), and the like have high chemical resistance in comparison with other resin and satisfy the criteria of metal elution. Though these resin have high chemical resistance, their hardness tends to be affected by change of temperature. If mechanical properties change due to deterioration by micro cracks or plastic deformation caused by long pressing, an amount of deformation of the diaphragm relative to predetermined pressure changes, and consequently accurate pressure cannot be measured.

Corrosive chemical such as hydrofluoric acid or the like is not completely isolated by these resin. If adhesive between the pressure receiving device and the diaphragm is deteriorated by a small amount of chemical components (substances such as gas and the like) which transmit these resin, adhesion between the pressure receiving device and the diaphragm decreases, the pressure receiving device is damaged, whereby measurement reliability or measurement accuracy of the amount of deformation of the diaphragm is affected seriously.

SUMMARY OF THE INVENTION

The present invention is intended for a fluid pressure sensor, and it is an object of the present invention to improve chemical resistance to a pressure sensor and extend the lifetime of the pressure sensor.

The pressure sensor in accordance with the present invention comprises a pressure chamber filled with fluid whose pressure is to be measured; a thin-plate diaphragm which is elastically deformed according to pressure of fluid in the pressure chamber, a part of the diaphragm, which is in contact with the fluid, being made of silicon carbide, glassy carbon, or diamond; and a detection mechanism for detecting an amount of deformation of the diaphragm. With this structure, it is possible to extend the lifetime of the pressure sensor against corrosive fluid.

To produce the diaphragm at low cost, preferably, a base part of the diaphragm is made of graphite, and a thin film of silicon carbide which is in contact with fluid in the pressure chamber is formed on a surface of the base part. Also, the base part may be a silicon substrate, and a thin film of silicon carbide which is in contact with fluid in the pressure chamber can be formed on a surface of the base part.

According to an aspect of the present invention, the detection mechanism emits a light beam to the diaphragm and detects a light receiving position of the light beam reflected on the diaphragm, to detect an amount of deformation of the diaphragm. According to another aspect of the present invention, the detection mechanism detects an amount of deformation of the diaphragm on the basis of a capacitance between a first electrode provided on one surface of the diaphragm, the opposite surface of which faces the pressure chamber, and a second electrode facing the first electrode without in contact with the first electrode. This makes it possible to measure the amount of deformation of the diaphragm with high accuracy. Specifically, it is possible to provide the detection mechanism easily by using a light beam in measurement.

Preferably, the pressure sensor further comprises channels for replacing gas in a space isolated from the pressure chamber by the diaphragm with external air. Even if corrosive gas flows into the space isolated from the pressure chamber by the diaphragm from the pressure chamber, deterioration of the detection mechanism is prevented.

The present invention is also intended for a substrate processing apparatus comprising the pressure sensor. The substrate processing apparatus may comprise a process bath in which substrates are dipped or a discharge outlet supplying a processing liquid onto a substrate while rotating the substrate. Preferably, the pressure sensor is applied to an apparatus where an allowable concentration of elution in the processing liquid of any one of Na, K, Ca, Mg, Al, Ti, Cr, Mn, Fe, Ni, Cu, Zn, W, and Pb is 10 ppb or less. By extending the lifetime of the pressure sensor, manufacturing cost for a semiconductor substrate can be reduced.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
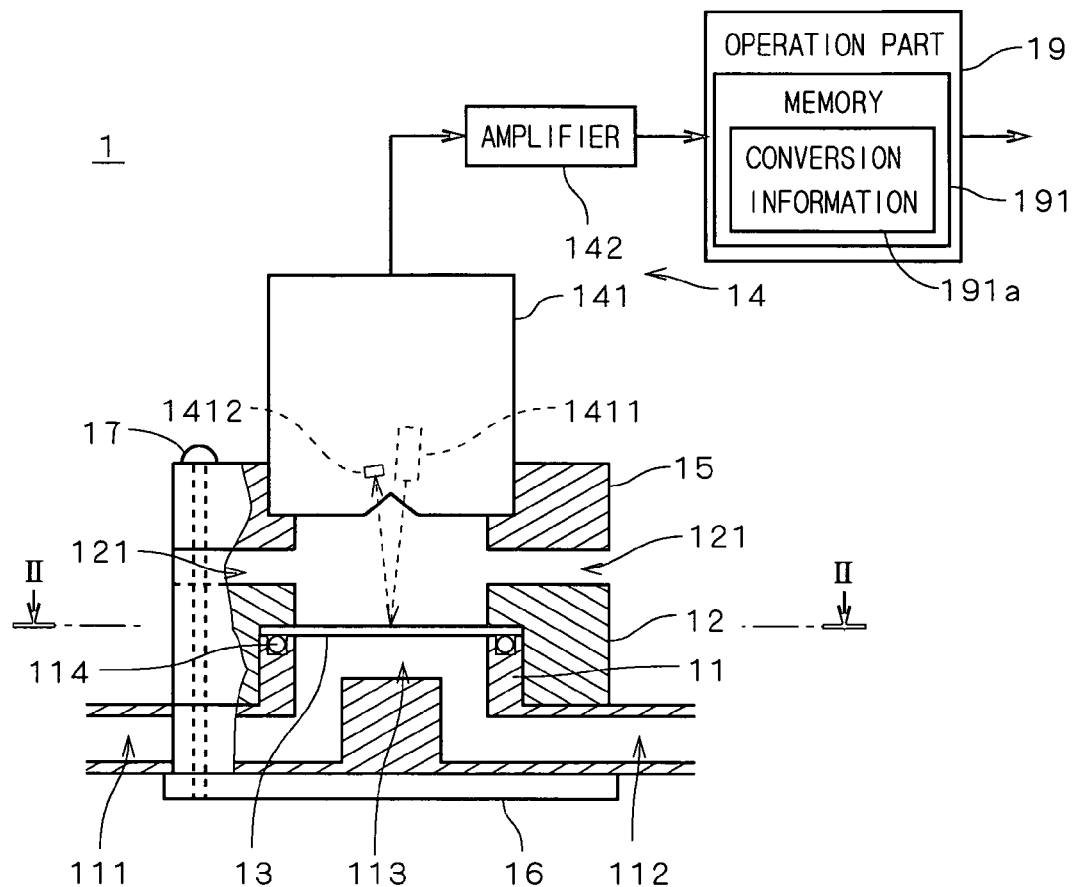
FIG. 1 is a longitudinal sectional view showing a construction of a pressure sensor in accordance with a first preferred embodiment.
Figure 2:
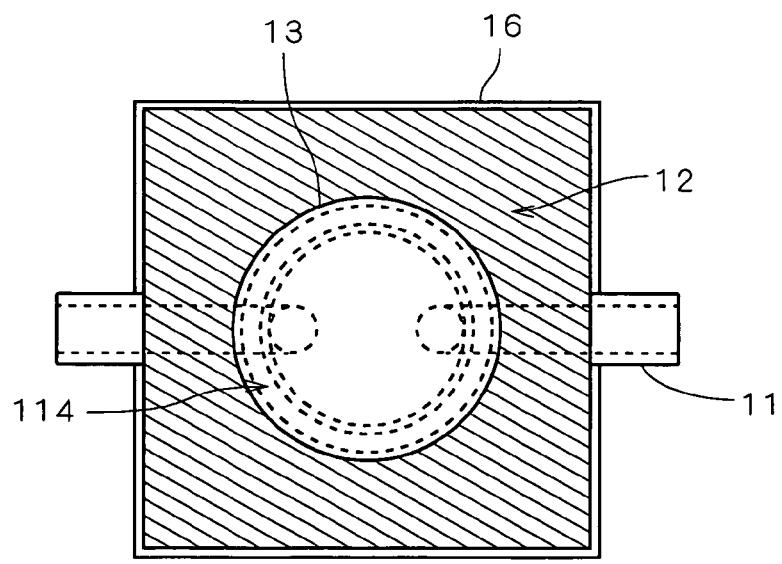
FIG. 2 is a transverse sectional view at the positions indicated by the arrows II-II in FIG. 1.

FIG. 1 is a longitudinal sectional view showing a construction of a pressure sensor 1 in accordance with the first preferred embodiment of the present invention and FIG. 2 is a transverse sectional view at the position indicated by the arrows II-II in FIG. 1. The pressure sensor 1 is installed on a conduit through which fluid flows and used for measuring pressure of fluid.

As shown in FIGS. 1 and 2, the pressure sensor 1 comprises a thin disk-shaped diaphragm 13 which is elastically deformed according to pressure of fluid, a lower fixing member 11 contacting with a lower surface of a peripheral edge of the diaphragm 13, and an upper fixing member 12 contacting with an upper surface of a peripheral edge of the diaphragm 13. The peripheral edge of the diaphragm 13 is fixed between the lower fixing member 11 and the upper fixing member 12. As shown in FIG. 1, the pressure sensor 1 comprises a laser displacement meter 14 which is a detection mechanism for detecting an amount of deformation of the diaphragm 13, a sensor part 141 of the laser displacement meter 14 is supported by a sensor supporting member 15, and the sensor part 141 is connected to an amplifier 142. Under the lower fixing member 11, provided is a base plate 16 for locating the pressure sensor 1 in a desired place. The pressure sensor 1 further comprises an operation part 19 connected to the amplifier 142 of the laser displacement meter 14.

The lower fixing member 11 and the upper fixing member 12 are made of resin with high chemical resistance (such as fluorocarbon resin). A channel 111 connected to a pipe of upstream side and a channel 112 connected to a pipe of downstream side are formed in the lower fixing member 11. Under the diaphragm 13, a pressure chamber 113 connected to the channels 111, 112 and filled with fluid whose pressure is to be measured is provided.

The diaphragm 13 is a thin plate and made of graphite. Since a thin film of silicon carbide (SiC) having a thickness of several hundreds of micrometers is formed on a lower surface (liquid contacting surface) of the diaphragm 13 which is a part in contact with the fluid in the pressure chamber 113, the diaphragm 13 has high corrosion resistance (i.e., chemical resistance) and permeation resistance to corrosive fluid. The thin film of silicon carbide is formed by CVD (Chemical Vapor Deposition), sputtering, or the like, whereby dense thin film with good crystallinity is formed. Other preferable base part for forming thin film of silicon carbide on the surface in contact with the fluid in the pressure chamber 113 may be a silicon substrate. Also in this case, it is possible to easily form thin film of silicon carbide by CVD or sputtering. The diaphragm 13 can be formed of other preferable material having excellent corrosion resistance and permeation resistance, such as a thin plate of glassy carbon (amorphous carbon), and in this case it is not necessary to form thin film of silicon carbide. The diaphragm 13 can be formed of silicon carbide itself.

As shown in FIGS. 1 and 2, ring-like groove is provided in an overlapping area of the lower fixing member 11 and the diaphragm 13, and a fluororubber O-ring 114 is disposed in the groove. With this structure, the pressure chamber 113 is sealed from a space above the diaphragm 13.

The sensor supporting member 15 is made of fluorocarbon resin or PVC (polyvinyl chloride), and the sensor part 141 is supported by the sensor supporting member 15 above the diaphragm 13 without being in contact with the diaphragm 13 (for example, a clearance of 3 mm or more is provided between the sensor part 141 and the diaphragm 13). Since the laser displacement meter 14 for emitting a laser beam to the diaphragm 13 is used as the detection mechanism for detecting an amount of deformation of the diaphragm 13 without being in contact with the diaphragm 13, the diaphragm 13 and the detection mechanism are completely separated and the detection mechanism can be easily positioned. The sensor supporting member 15 may be integrated with the upper fixing member 12.

A plurality of vent holes 121 for communicating a space above the diaphragm 13 with the outside are provided between the upper fixing member 12 and the sensor supporting member 15. As described above, components such as gas of corrosive fluid or the like cannot transmit the diaphragm 13, but depending on kinds of fluid, a small amount of corrosive gas transmits the diaphragm 13 through the O-ring 114. In the pressure sensor 1, the vent holes 121 are channels for replacing corrosive gas entering into a space isolated from the pressure chamber 113 by the diaphragm 13 with external air. The plurality of vent holes 121 (two vent holes 121 in the preferred embodiments) make it possible to efficiently perform natural exchange of gas (i.e., air ventilation).

In the pressure sensor 1, the lowest base plate 16 is a resin plate (for example, made of PVC), and the upper fixing member 12, the lower fixing member 11, and the sensor supporting member 15 are fixed by the base plate 16 and tightening screws 17 made of PEEK (poly-ether-ether-ketone) or metal. With this structure, the diaphragm 13 is sandwiched between the upper fixing member 12 and the lower fixing member 11.

When the pressure sensor 1 is used, fluid continuously flows through the channel 111 of upstream side, the pressure chamber 113 and the channel 112 of downstream side in this order. Depending on measuring target of the pressure sensor 1, there may be a case where an end of the channel 112 is closed, and the channel 111, the pressure chamber 113 and the channel 112 are filled with the fluid. The diaphragm 13 is slightly deformed due to pressure of the fluid in the pressure chamber 113, and the amount of deformation of the diaphragm 13 is proportional to pressure of the fluid (see Eq. 1 in later discussion). Here, the amount of deformation of the diaphragm 13 refers to displacement of a specific part of the diaphragm 13, and to improve accuracy of outputted pressure value, measurement by the laser displacement meter 14 is performed to the central part of the diaphragm 13 where the amount of deformation is maximum. In the following description, the amount of deformation of the diaphragm 13 refers to an amount of displacement of the central part of the diaphragm 13.

On the central part of the upper surface (i.e., surface without in contact with fluid) of the diaphragm 13, a thin film of precious metal such as platinum (Pt) or the like with mirror surface is formed as necessary for improving reflection efficiency of a laser beam by using methods, for example, evaporation, plating, sputtering, or the like. A light beam is emitted from a light beam emitting part 1411 in the sensor part 141 to the thin film of the diaphragm 13 with mirror surface with being inclined. As indicated by broken arrows in FIG. 1, the light beam incident on and reflected by the thin film with mirror surface is received by a light receiving part 1412 in the sensor part 141, and a light receiving position of the light beam changes according to the amount of deformation of the diaphragm 13. The light receiving part 1412 detects a light receiving position and outputs it as a voltage. The voltage is outputted to the amplifier 142 and amplified and digitized by the amplifier 142, to be converted into a value indicating the amount of deformation. Then, the value indicating the amount of deformation is outputted to the operation part 19.

In the operation part 19, a relational expression or correlation table between the amount of deformation and the pressure is inputted as conversion information 191a and stored in a memory 191 in advance. The value indicating the amount of deformation detected by the laser displacement meter 14 is converted into a pressure value of the fluid by the relational expression or correlation table, and the pressure value is outputted to a display and the like which are additionally provided.

Though the construction and operation of the pressure sensor 1 have been discussed above, next discussion will be made on design examples of the shape of the diaphragm 13.

The amount of deformation of the diaphragm 13, whose peripheral edge is fixed and on which pressure is applied from the fluid, can be regarded as an amount of displacement ω (m) when uniform load is applied to a circular plate with the circumference fixed, and the amount of displacement ω is expressed as Eq. 1.

$$\omega = \frac{pa^4}{64D}\left(1 - \frac{r^2}{a^2}\right)^2 \quad \text{Eq. 1}$$

Herein, p is pressure (Pa) of the fluid, a is a radius (m) of a pressure receiving area of the diaphragm 13, D is flexural rigidity (Pa·m$^3$) of the diaphragm 13, r is a distance (m) from the center of the position where the amount of deformation (the amount of displacement) is detected, h is a thickness (m) of the diaphragm 13, E is Young's modulus (Pa) of the diaphragm 13, and ν is Poisson's ratio of the diaphragm 13. The flexural rigidity D (Pa·m$^3$) is expressed as Eq. 2.

$$D = \frac{Eh^3}{12(1-v^2)} \quad \text{Eq. 2}$$

The maximum stress σ (Pa) on the diaphragm 13 is expressed as Eq. 3.

$$\sigma = 0.750 \times \frac{pa^2}{h^2} \quad \text{Eq. 3}$$

For example, when a pressure sensor having the maximum measurement pressure of 300 kPa is fabricated by using a diaphragm having a diameter of pressure receiving area of 30 mm and a thickness of 0.5 mm, which is made by a thin plate of silicon carbide prepared by a method such as CVD or the like, the maximum stress in the diaphragm is 202.5 MPa from Eq. 3. Since this value is 50% or less of 590 MPa which is flexural strength of silicon carbide, if pressure twice the maximum measurement pressure is applied to the diaphragm, the diaphragm is not broken.

The amount of deformation of the diaphragm per 1 kPa is 0.165 μm from Eqs. 1 and 2. When measurement accuracy of a laser displacement meter to be used is +/−0.2 μm, the maximum error of a pressure value relative to the true value is +/−1.21 kPa. A ratio of the error to the maximum measurement pressure of the pressure sensor is +/−0.403% and it is equal to or less than that of a conventional pressure sensor.

In the above calculations, the diaphragm is made of only silicon carbide for convenience of description of the design examples, but as described above, it is preferable that the diaphragm is made by forming the thin film of silicon carbide on a graphite plate or silicon substrate. Actually, the maximum stress is reduced while suppressing degradation in detection accuracy by increasing thickness of the graphite plate or silicon substrate which is base part, decreasing a radius thereof, or the like.

As discussed above, in the pressure sensor 1, since a thin film of silicon carbide which is in contact with the fluid in the pressure chamber 113 is formed on the surface of the base part of the diaphragm 13 where graphite (or silicon substrate) is base part (or glassy carbon or silicon carbide is used as other preferable material for the diaphragm 13), it is possible to prevent substances such as corrosive gas and the like from transmitting the diaphragm 13 while directly measuring pressure of corrosive fluid used in a semiconductor processing apparatus. It is therefore possible to improve reliability of the pressure sensor 1 and extend the lifetime of the pressure sensor 1 with suppressing deterioration of the detection mechanism. Specifically, the pressure sensor 1 is suitable for measurement of pressure of fluid containing at least one of HF (hydrofluoric acid), HCl (hydrochloric acid), $HNO_3$ (nitric acid), $H_2SO_4$ (sulfuric acid), $H_2O_2$ (hydrogen peroxide solution), and $NH_4OH$ (ammonia water). Since the pressure sensor 1 has corrosion resistance to all these chemicals, the pressure sensor 1 can be used in any process of manufacturing semiconductors. The diaphragm is produced by forming a thin film of silicon carbide on a base part such as graphite, silicon substrate, or the like, thereby permitting production of the diaphragm at low cost in comparison with the case where the diaphragm is made of only silicon carbide.

In the pressure sensor 1, by using the laser displacement meter 14 as the detection mechanism, it is possible to detect the amount of deformation of the diaphragm 13 accurately without in contact with the diaphragm 13 with no mechanical resistance. Since the diaphragm and the detection mechanism are completely separated, the detection mechanism can be easily provided. Further, even if corrosive gas flows into the detection mechanism through the O-ring 114 as discussed above, the corrosive gas is exhausted from the vent holes 121, it is therefore possible to prevent deterioration of the detection mechanism and increase reliability and the lifetime of the pressure sensor 1.

Table 1 shows results of metal elution experiment which is performed in 50% hydrofluoric acid in the same environment where the pressure sensor 1 is used in a semiconductor manufacturing apparatus. The experiment is directed to PFA conventionally used as material for the diaphragm 13, silicon carbide and glassy carbon which are used for the pressure sensor 1, and sapphire glass which is comparative material. It is obvious from Table 1 that silicon carbide and glassy carbon have an elution concentration of metal equal to or lower than the detection limit in almost all the metal and have the same performance as PFA, silicon carbide and glassy carbon are therefore excellent for material of the diaphragm 13. Though sapphire glass is good in that it has impermeability to corrosive substances, aluminum of 10 ppb or more is eluted and thus sapphire glass cannot be used for a pressure sensor of a semiconductor processing apparatus.

TABLE 1

|    | PFA    | SILICON CARBIDE | GLASSY CARBON | SAPPHIRE GLASS |
|----|--------|-----------------|---------------|----------------|
| Na | <0.05  | <0.05           | <0.05         | <0.05          |
| Mg | <0.05  | <0.05           | <0.05         | <0.05          |
| Al | 0.05   | <0.05           | 0.05          | 14             |
| K  | <0.05  | <0.05           | <0.05         | <0.05          |
| Ca | <0.05  | <0.05           | <0.05         | <0.05          |
| Ti | <0.05  | <0.05           | <0.05         | 0.07           |
| Cr | <0.05  | <0.05           | <0.05         | <0.05          |
| Mn | <0.05  | <0.05           | <0.05         | <0.05          |
| Fe | 0.05   | 0.06            | <0.05         | 0.06           |
| Ni | <0.05  | <0.05           | <0.05         | 0.06           |
| Cu | <0.05  | <0.05           | <0.05         | <0.05          |
| Zn | <0.05  | <0.05           | <0.05         | <0.05          |
| W  | <0.05  | <0.05           | <0.05         | <0.05          |
| Pb | <0.05  | <0.05           | <0.05         | <0.05          |

(UNIT: ppb)

Figure 3:
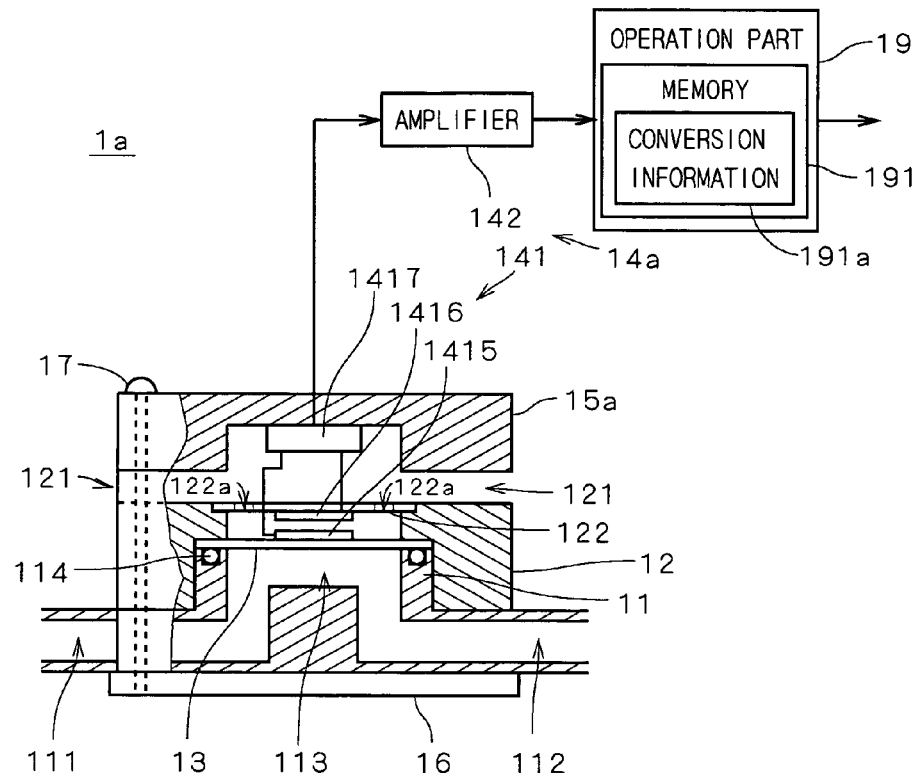
FIG. 3 is a longitudinal sectional view showing a construction of a pressure sensor in accordance with a second preferred embodiment.

Next discussion will be made on a pressure sensor 1a in accordance with the second preferred embodiment. FIG. 3 is a longitudinal sectional view showing a construction of the pressure sensor 1a. As shown in FIG. 3, in the pressure sensor 1a, a capacitance-type displacement meter 14a which is a detection mechanism for detecting an amount of deformation of the diaphragm 13 is provided instead of the laser displacement meter 14 of the pressure sensor 1 shown in FIG. 1, and a circuit supporting member 15a is provided instead of the sensor supporting member 15 in FIG. 1. Other constituent elements are almost the same as those of FIG. 1 and are represented by the same reference signs in FIG. 3.

The sensor part 141 of the displacement meter 14a comprises a first electrode 1415 and a second electrode 1416 provided opposite to each other and a circuit part 1417. In the pressure sensor 1a, a plate 122 is located above the diaphragm 13 and it is an electrode base fixed inside an upper opening end of the upper fixing member 12. Between the upper fixing member 12 and the circuit supporting member 15a, the plurality of vent holes 121 for communicating a space above the diaphragm 13 with the outside are formed. The plate 122 is located lower than the vent holes 121 and a plurality of holes 122a are formed in the plate 122.

Like in the first preferred embodiment, the peripheral edge of the diaphragm 13 is fixed between the upper fixing member 12 and the lower fixing member 11, the first electrode 1415 is directly attached on one surface of the diaphragm 13, and the opposite surface of which faces the pressure chamber 113. The second electrode 1416 is formed on a lower surface of the plate 122 and faces the first electrode 1415 without being in contact with the first electrode 1415. The circuit part 1417 is attached on an inner surface of the circuit supporting member 15a above the plate 122, and the first electrode 1415 and the second electrode 1416 are electrically connected to the circuit part 1417 by wiring.

While the pressure sensor 1 is used, a capacitance between the first electrode 1415 and the second electrode 1416 is continuously monitored by the circuit part 1417. When the diaphragm 13 is slightly deformed due to pressure of fluid in the pressure chamber 113, the capacitance between the first electrode 1415 and the second electrode 1416, which changes because of deformation of the diaphragm 13, is outputted from the circuit part 1417 as a voltage to the amplifier 142. The voltage is amplified and digitized by the amplifier 142, to be converted into a value indicating the amount of deformation of the diaphragm 13 and outputted to the operation part 19. In the operation part 19, like in the first preferred embodiment, conversion information 191a which is a relational expression or correlation table between the amount of deformation and the pressure is inputted and stored in the memory 191 in advance, and the value indicating the amount of deformation detected by the displacement meter 14a is converted into a pressure value by the conversion information 191a. The pressure value is outputted to a display and the like which are additionally provided.

In the pressure sensor 1a, the capacitance-type displacement meter 14a for converting the amount of deformation into the capacitance is used as the detection mechanism for detecting the amount of deformation of the diaphragm 13, the first electrode 1415 of the displacement meter 14a is directly provided on one surface of the diaphragm 13, and the opposite surface of which faces the pressure chamber 113, whereby pressure of the fluid can be measured with high accuracy. Since the vent holes 121 are connected to the space above the diaphragm 13 through the holes 122a of the plate 122 and gas in the space is replaced with external air, it is possible to prevent the first electrode 1415 and the second electrode 1416 from deteriorating due to a small amount of corrosive substances flowing through the O-ring 114. As a result, it is possible to improve reliability of the pressure sensor 1a and extend the lifetime of the pressure sensor 1a.

Figure 4:
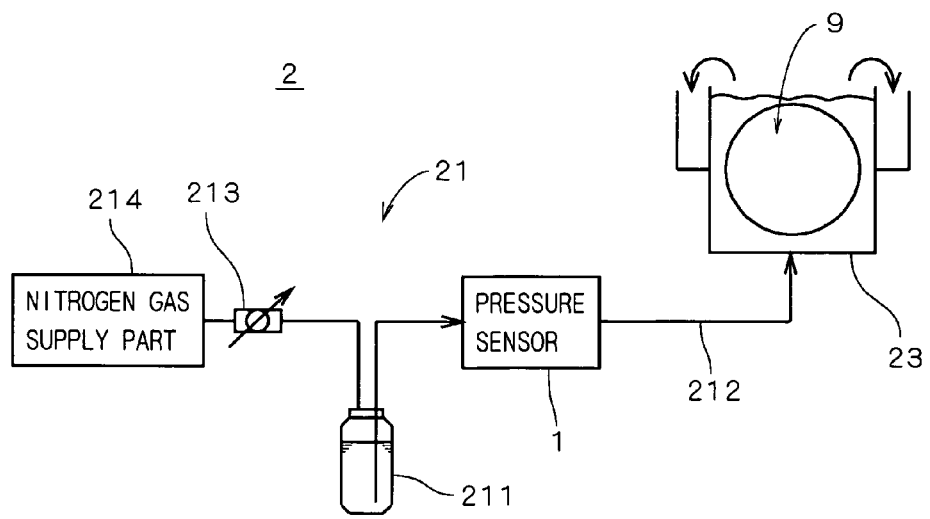
FIG. 4 is a view showing a construction of a substrate processing apparatus in accordance with a third preferred embodiment.

Referring to FIG. 4, next discussion will be made on a substrate processing apparatus 2 as the third preferred embodiment comprising the pressure sensor 1 shown in FIG. 1 (or the pressure sensor 1a shown in FIG. 3). The substrate processing apparatus 2 is a so-called batch-type apparatus for simultaneously etching a plurality of semiconductor substrates 9 (hereinafter, referred to as simply "substrates 9").

As shown in FIG. 4, the substrate processing apparatus 2 comprises a processing liquid supplying part 21 and a process bath 23 for storing a processing liquid supplied from the processing liquid supplying part 21, in which the approximately disk-shaped substrates 9 in a vertical state are dipped. In FIG. 4, the substrates 9 are arranged in parallel with a direction perpendicular to the sheet of figures. The processing liquid supplying part 21 comprises a pressure vessel 211 where the processing liquid is stored, and the pressure vessel 211 and the process bath 23 are connected by a pipe 212. The pressure vessel 211 is connected to a nitrogen ($N_2$) gas supply part 214 through a regulator 213. The processing liquid supplying part 21 comprises the pressure sensor 1 installed on the pipe 212, and the pressure sensor 1 measures supply pressure of the processing liquid which flows the pipe 212 to be supplied to the process bath 23.

In the substrate processing apparatus 2 shown in FIG. 4, nitrogen gas is supplied from the nitrogen gas supply part 214 to the pressure vessel 211, and the processing liquid is pumped out to the pipe 212 by the pressure in the pressure vessel 211. At this time, the regulator 213 controls supply pressure of nitrogen gas (i.e., supply pressure of the processing liquid) and an amount of supply of the processing liquid per unit time is controlled. The processing liquid flowing through the pipe 212 is supplied to the process bath 23 from the bottom of the process bath 23, the plurality of substrates 9 held in the process bath 23 are gradually dipped into the processing liquid stored in the process bath 23 from the lower side, and then etching of the substrates 9 is performed.

In the substrate processing apparatus 2, at the processing of the substrates 9, supply pressure of the processing liquid is monitored by the pressure sensor 1. When the pressure sensor 1 detects variation of supply pressure of the processing liquid, the regulator 213 controls the supply pressure of the processing liquid and the processing liquid is supplied to the process bath 23 at constant supply pressure. As a result, etching rate of silicon dioxide films on the substrates 9 is controlled with high accuracy. In the pressure control, advanced feedback control such as PID Control may be performed. In monitoring of supply pressure, there may be a case where abnormal variation of the supply pressure of the processing liquid is only notified to a user by alarm.

In the substrate processing apparatus 2, by extending the lifetime of the pressure sensor 1, frequent calibrations and the number of exchange of the pressure sensor 1 due to the lifetime can be decreased. Accordingly, it is possible to suppress downtime and running cost, and reduce manufacturing cost for semiconductor substrates. The elution concentration in the fluid which is the processing liquid of any one of Na (natrium), K (kalium), Ca (calcium), Mg (magnesium), Al (aluminum), Ti (titanium), Cr (chromium), Mn (manganese), Fe (iron), Ni (nickel), Cu (copper), Zn (zinc), W (tungsten), and Pb (lead), which are substances causing deterioration of a semiconductor device, is 10 ppb or less in the semiconductor processing apparatus, however, as discussed above (see Table 1), since metal elution from the diaphragm 13 in the pressure sensor 1 is kept at an extremely low level which satisfies the above concentration, it is possible to suppress degradation of processed semiconductor substrates and improve the yield.

Figure 5:
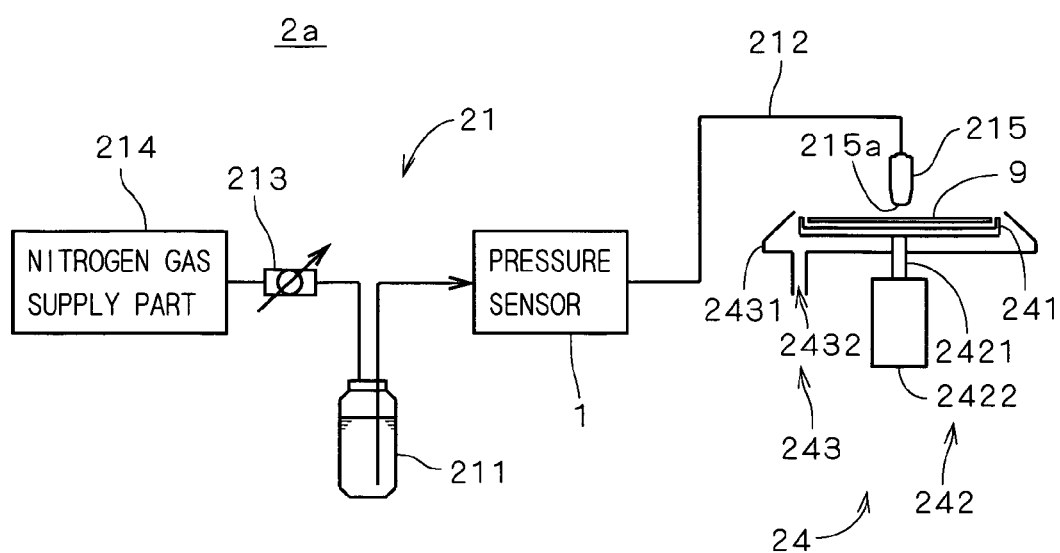
FIG. 5 is a view showing a construction of a substrate processing apparatus in accordance with a fourth preferred embodiment.

Referring to FIG. 5, next discussion will be made on another substrate processing apparatus 2a as the fourth preferred embodiment comprising the pressure sensor 1 shown in FIG. 1 (or the pressure sensor 1a shown in FIG. 3). The substrate processing apparatus 2a is a so-called single wafer-type apparatus for etching one substrate 9, and a substrate rotating part 24 is provided instead of the process bath 23 of the substrate processing apparatus 2 shown in FIG. 4. Above the substrate rotating part 24, a nozzle 215 having a discharge outlet 215a which supplies the processing liquid onto the substrate 9 is positioned as a part of a processing liquid supplying part 21. Other constituent elements are the same as those of FIG. 4 and are represented by the same reference signs in FIG. 5.

As shown in FIG. 5, like in the third preferred embodiment, the processing liquid supplying part 21 of the substrate processing apparatus 2a comprises the pressure vessel 211 where a processing liquid such as hydrofluoric acid and the like is stored, the nitrogen gas supply part 214 connected to the pressure vessel 211 through the regulator 213, and the pressure sensor 1 installed on the pipe 212 extending from the pressure vessel 211, and a nozzle 215 is attached to an end of the pipe 212.

The substrate rotating part 24 comprises a chuck 241 which is a substrate holding part for holding the approximately disk-shaped substrate 9 in a horizontal state on the lower surface and the periphery of the substrate 9, a rotating mechanism 242 for rotating the chuck 241, and a cup 243 covering the circumference of the chuck 241.

The rotating mechanism 242 comprises a shaft 2421 coupled to the bottom of the chuck 241 and a motor 2422 for rotating the shaft 2421. By driving the motor 2422, the substrate 9 rotates around an axis in a vertical direction together with the shaft 2421 and the chuck 241. The cup 243 comprises a side wall 2431 covering the circumference of the substrate 9 held by the chuck 241 and a drain outlet 2432 connected to the bottom of the side wall 2431.

In the substrate processing apparatus 2a, the nozzle 215 is located above the substrate 9, and the processing liquid is supplied onto the substrate 9 from the nozzle 215 through the pressure sensor 1 while rotating the substrate 9 held by the chuck 241. The processing liquid spreads toward the periphery on the upper surface of the substrate 9 by the centrifugal force, and etching of the substrate 9 is performed. The processing liquid moving to the edge of the substrate 9 is scattered from the edge and received by the side wall 2431 of the cup 243 or falls on the bottom of the cup 243 directly and then it is drained from the drain outlet 2432. At this time, pressure of the processing liquid directed to the discharge outlet 215a is measured by the pressure sensor 1, and discharge pressure of the processing liquid is controlled on the basis of measured pressure with high accuracy. Since the processing liquid is discharged from the nozzle 215 at desired discharge pressure, it is possible to control etching rate of the substrate 9 with high accuracy and perform appropriate processing. In monitoring of discharge pressure by the pressure sensor 1, there may be a case where the abnormality is only notified to a user.

In the substrate processing apparatus 2a, like in the third preferred embodiment, it is possible to reduce manufacturing cost for the semiconductor substrates by using the long-life pressure sensor 1, and degradation of the semiconductor substrates can be suppressed by satisfying the above elution concentration of metal in the semiconductor manufacturing apparatus.

Though the preferred embodiments of the present invention have been discussed above, the present invention is not limited to the above-discussed preferred embodiments, but allows various variations.

For example, for the diaphragm 13 of the pressure sensors 1, 1a in accordance with the first and second preferred embodiments, the graphite plate or silicon substrate on which a thin film of silicon carbide is formed, plate-like glassy carbon where the thin film does not need to be formed, or silicon carbide is used. As other preferable examples, a graphite plate, silicon substrate, or metal plate on which a thin film of diamond is formed can be used for the diaphragm 13. In other words, making a part of the diaphragm, which is in contact with the fluid, of silicon carbide, glassy carbon, or diamond makes it possible to improve corrosion resistance and penetration resistance of the diaphragm 13, and extends the lifetime of the pressure sensor.

Though the laser displacement meter 14 is used in the pressure sensor 1 in accordance with the first preferred embodiment, another optical method may be used as a method for measuring the amount of deformation of the diaphragm 13 without in contact with the diaphragm 13. For example, by measuring interference between an incident light and a reflected light to/from the diaphragm 13, the amount of deformation of the diaphragm 13 can be detected easily. Also, by optically detecting the amount of deformation of the diaphragm 13, it is possible to easily provide a distance between the diaphragm 13 and the detection mechanism (for example, a distance of 5 mm or more is provided), and easily prevent corrosive gas from flowing into the detection mechanism.

In the pressure sensors 1, 1a, exchange of gas in the space above the diaphragm 13 is naturally performed through the vent holes 121, but air ventilation may be forcedly performed.

In the pressure sensors 1, 1a, the amplifier 142 and the sensor part 141 (the circuit part 1417 in the case of the pressure sensors 1a) may be integrated, the amplifier 142 and the operation part 19 may be combined, or these three elements can be provided as a unit.

In the substrate processing apparatus in accordance with the fourth preferred embodiment, the discharge outlet 215a can have other various shapes. The processing liquid may be supplied by spray system or discharged from a slit, for example.

Though in the preferred embodiments, discussion has been made on measurement of pressure of fluid by the pressure sensor, such a pressure sensor can be utilized for a pressure sensor for a differential pressure flowmeter. In this case, for example, flowrate control with higher accuracy can be achieved by feedback-control.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2005-145367 filed in the Japan Patent Office on May 18, 2005, the entire disclosure of which is incorporated herein by reference.

What is claimed is:

1. A substrate processing apparatus for processing a substrate, comprising:
   a process bath for storing a processing liquid, in which substrates are dipped; and
   a processing liquid supplying part for supplying a processing liquid to said process bath, wherein
   said processing liquid supplying part comprises a pressure sensor for measuring pressure of a processing liquid supplied to said process bath, and
   said pressure sensor comprises
   a pressure chamber filled with fluid whose pressure is to be measured;
   a thin-plate diaphragm which is elastically deformed according to pressure of fluid in said pressure chamber, a part of said diaphragm, which is in contact with said fluid, being made of silicon carbide, glassy carbon, or diamond;
   a detection mechanism for detecting an amount of deformation of said diaphragm; and
   an operation part for storing conversion information representing a relationship between an amount of deformation of said diaphragm and pressure of said fluid, and obtaining pressure of said fluid on the basis of said conversion information and an amount of deformation of said diaphragm detected by said detection mechanism.

2. The substrate processing apparatus according to claim 1, wherein
   an elution concentration in said processing liquid of any one of Na, K, Ca, Mg, Al, Ti, Cr, Mn, Fe, Ni, Cu, Zn, W, and Pb is 10 ppb or less.

3. A substrate processing apparatus for processing a substrate, comprising:
   a substrate holding part for holding a substrate in a horizontal state;
   a rotation mechanism for rotating said substrate holding part around an axis in a vertical direction; and
   a processing liquid supplying part for supplying a processing liquid onto a substrate held by said substrate holding part from a discharge outlet, wherein
   said processing liquid supplying part comprises a pressure sensor for measuring pressure of a processing liquid directed to said discharge outlet, and
   said pressure sensor comprises
   a pressure chamber filled with fluid whose pressure is to be measured;
   a thin-plate diaphragm which is elastically deformed according to pressure of fluid in said pressure chamber, a part of said diaphragm, which is in contact with said fluid, being made of silicon carbide, glassy carbon, or diamond;
   a detection mechanism for detecting an amount of deformation of said diaphragm; and
   an operation part for storing conversion information representing a relationship between an amount of deformation of said diaphragm and pressure of said fluid, and obtaining pressure of said fluid on the basis of said conversion information and an amount of deformation of said diaphragm detected by said detection mechanism.

4. The substrate processing apparatus according to claim 3, wherein
   an elution concentration in said processing liquid of any one of Na, K, Ca, Mg, Al, Ti, Cr, Mn, Fe, Ni, Cu, Zn, W, and Pb is 10 ppb or less.

* * * * *